United States Patent [19]

Kitao et al.

[11] Patent Number: 5,051,210

[45] Date of Patent: Sep. 24, 1991

[54] ALUMINA FIBER AND A METHOD OF PRODUCING THE SAME

[75] Inventors: Toshio Kitao, Kyoto; Yoshiharu Kimura, Ohmihachiman; Hideki Yamane, Kyoto; Koichi Hashimoto, Osaka, all of Japan

[73] Assignee: Kyoto Institute of Technology, Kyoto, Japan

[21] Appl. No.: 483,174

[22] Filed: Feb. 22, 1990

Related U.S. Application Data

[62] Division of Ser. No. 317,490, Mar. 1, 1989.

[30] Foreign Application Priority Data

Aug. 3, 1988 [JP] Japan ................................ 63-192792

[51] Int. Cl.$^5$ ........................ H01B 1/06; B32B 15/00
[52] U.S. Cl. .................................. 252/518; 252/508; 428/374; 428/319; 501/95
[58] Field of Search .................. 252/518, 508, 511; 423/492, 592; 428/377, 379, 374; 264/177.19, 177.2, 29.2, 205, 211.15, 211.17; 501/95, 153

[56] References Cited

U.S. PATENT DOCUMENTS

| | | | |
|---|---|---|---|
| 4,716,055 | 12/1989 | Sanders et al. | 264/205 |
| 4,724,109 | 2/1988 | Yamashita et al. | 264/205 |
| 4,801,502 | 1/1989 | Weinrotter et al. | 264/211.19 |
| 4,997,601 | 3/1991 | Mininni et al. | 264/29.2 |

Primary Examiner—Josephine Barr

Attorney, Agent, or Firm—Sughrue, Mion, Zinn, Macpeak & Seas

[57] ABSTRACT

An electrically conductive alumina fiber which heretofore known only as electrically insulative is now provided, which comprises an aluminum oxide matrix, and a continuous phase of carbon in the aluminum oxide matrix, the continued phase of carbon affording an electrically conductive property to the fiber. Also, a method of producing the alumina fiber is disclosed, comprising pyrolyzing a fiber of poly[(acyloxy)aloxane)] having a formula

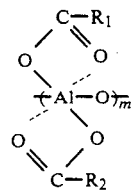

wherein, $R_1$ represents $CH_2CH_2OCH_2CH_3$, $R_2$ represents

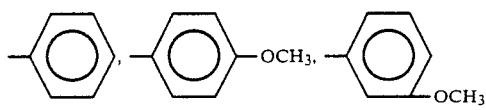

or other substituted aromatic group, in an inert atmosphere.

2 Claims, 1 Drawing Sheet

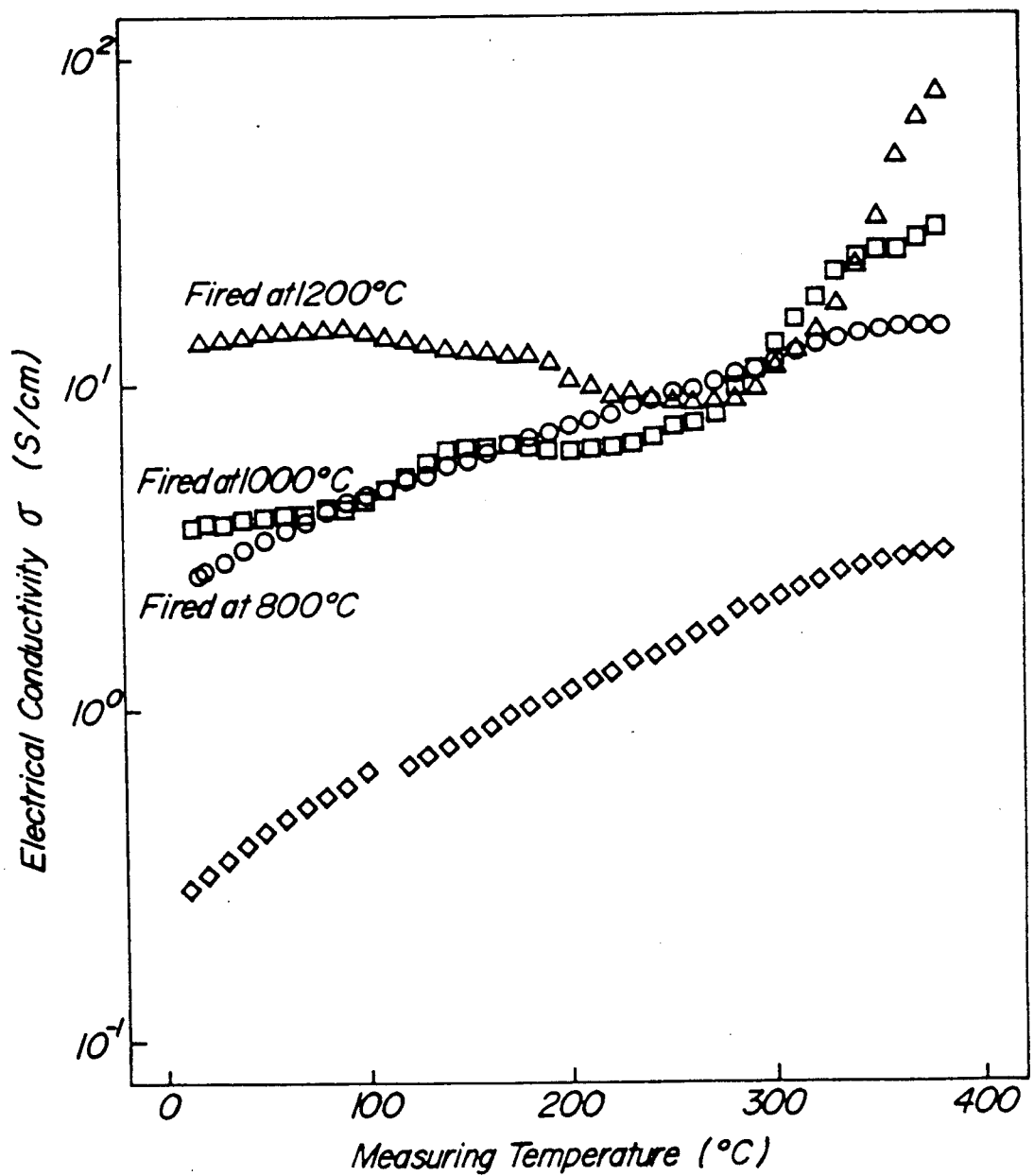
FIG_1

ALUMINA FIBER AND A METHOD OF PRODUCING THE SAME

This is a divisional of application No. 07/317,490 filed Mar. 1, 1989.

BACKGROUND OF THE INVENTION

1. Field of the Invention

The present invention relates to an alumina fiber and a method of producing the same.

2. Related Art Statement

Heretofore, metals are used as a conductive material, and high polymers are mainly used for the insulation of the conductive material from the exterior. If a heat resistance is particularly requested for the conductive material, heat resistant high polymers, glass cloths, or the like, are used.

However, metals have a drawback in that, if they are exposed to an oxygen-containing atmosphere at high temperatures, they are oxidized to change their electric properties. Meanwhile, though electrically conductive ceramics, such as SiC, are known, a method of making the electrically insulative ceramics electrically conductive has not yet been known at present.

SUMMARY OF THE INVENTION

The above drawbacks can be obviated by forming a continuous phase of an electrically conductive component in the interior of a superiorly heat resistant, corrosion resistant and electrically insulative ceramics.

An object of the present invention is to provide an electrically conductive alumina fiber consisting essentially of aluminum oxide suitable for use as an electric or electronic material, particularly for electric or electronic circuits or connectors thereto at high temperatures or in chemical agents or corrosive atmospheres.

Another object of the present invention is to provide a method of producing the electrically conductive alumina fiber.

The alumina fiber of the present invention comprises an aluminum oxide matrix and a phase of carbon in the aluminum oxide matrix, the phase of carbon affording an electrically conductive property to the alumina fiber.

The method of producing the alumina fiber of the present invention, comprises firing a fiber of poly[(acyloxy)aloxane] having a formula

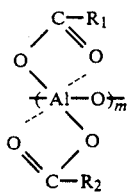

wherein, $R_1$ represents $CH_2CH_2OCH_2CH_3$, $R_2$ represents

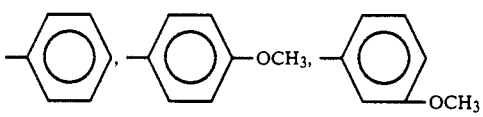

or other substituted aromatic groups.

In obtaining a fiber from poly[(acyloxy) aloxane], dry spinning method is preferably used.

The pyrolysis is preferably effected by heating the fiber up to a temperature of 800°–1,200° C. in an inert atmosphere.

The alumina fiber of the present invention consists essentially of aluminum oxide, and contains a phase of carbon in the aluminum oxide matrix, which is responsible for a good electrical conductivity of the fiber.

The precursor poly[(acyloxy)aloxane] is synthesized by using triethylaluminum as a starting material, and reacting it with two types of carboxylic acid and water. One type of the two types of carboxylic acid is a member of those aromatic carboxylic acids having an aromatic group, such as, benzoic acid, m-anisic acid, p-anisic acid, or the like, the other type of carboxylic acid is 3-ethoxypropionic acid (EPA).

The synthesis of the poly[(acyloxy)aloxane] is performed by two steps reaction or three steps reaction. At first, triethylaluminum and a mixture of the two types of carboxylic acids are reacted in the presence of tetrahydrofuran as a solvent in an inert atmosphere at −20° C. The amounts of the two types of carboxylic acids to be reciped are, 1 equivalent for the aromatic carboxylic acid, and 1.2 equivalent for 3-ethoxy propionic acid, respectively relative to triethylaluminum. In the case of the two steps reaction, the whole amounts of the two types of carboxylic acids are reacted. However, in the case of three steps reaction, 1 equivalent amount of 3-ethoxy propionic acid is reacted only. The reaction product is added and reacted with 1 equivalent amount of water dissolved in tetrahydrofuran relative to triethylaluminum at −20° C. in an inert atmosphere. In the three steps reaction, after the reaction with water, the rest of 3-ethoxy propionic acid is added and reacted. The product thus obtained is dissolved in a mixture of 5–30 wt %, preferably 10–20 wt %, of an alcoholic solvent, such as methanol, ethanol or phenol with toluene or xylene, to form a thick solution of 20–40 wt %. The thick solution is used as a spinning solution, from which a fiber is spun by a dry spinning method. Spinning atmosphere is air of a temperature from ambient to 70° C. A continuous fiber of about 10–100 μm in diameter can easily be obtained. The fiber is used as a precursor fiber.

The precursor fiber is pyrolyzed by heating it in an inert atmosphere up to 800°–1,200° C. at a temperature-raising rate of about 10° C./min to obtain the electrically conductive alumina fiber of the present invention.

The electrically conductive property of the alumina fiber of the present invention is brought about by a thermal decomposition of the high polymer having the main chain of the repetition of —(Al—O)— and the organic side chains of both the aliphatic carboxylic acid and the aromatic carboxylic acid in an inert atmosphere, which thermal decomposition making the high aloxane polymer inorganic, while converting the relatively heat stable aromatic ring into carbon existing as a continuous phase in the aluminum oxide matrix. By controlling the pyrolysis conditions, the surface layer of the fiber from which carbons are relatively easily eliminated is made high in aluminum oxide content to bring about an electrically insulative property.

BRIEF DESCRIPTION OF THE DRAWING

For a better understanding of the present invention, reference is made to the accompanying drawing, in which:

FIG. 1 is a characteristic graph showing a relation between a measuring temperature and an electrical conductivity of the alumina fiber of the present invention.

DESCRIPTION OF THE PREFERRED EMBODIMENTS

Hereinafter, the present invention will be explained in more detail with reference to examples.

EXAMPLE 1

7.96 ml (58 mmol) of triethylaluminum is dissolved in 24 ml of tetrahydrofuran to obtain a 25 vol % solution thereof. With stirring the solution at −20° C. is added into a solution of 8.825 g of m-anisic acid and 8.222 g of 3-ethoxy propionic acid (EPA) in 40 ml of tetrahydrofuran dropwise in a nitrogen atmosphere. After completion of the addition, the solution is kept stirred for about 1 hr at room temperature. The system is cooled again to −20° C., and a solution of 1.044 g of water in 10.6 ml of tetrahydrofuran is added in it dropwise under agitation. After completion of the addition, the solution is kept stirring at room temperature for a few hours. Thereafter, the products formed are precipitated in a large excess of hexane, filtrated, and dried in vacuo, to give a high polymer.

The high polymer thus obtained is dissolved in xylene containing 10 wt % of methanol to form a thick solution of 30 wt % of the solute. The thick solution is taken into a 5 ml injector made of polyethylene, and left for a few hours for deaeration. The injector is fitted with a short severed injection needle of about 3 mm in length and about 0.7 mm in inner diameter. Subsequently, the thick high polymer solution is extruded from the injector through the injection needle, and the extrudate was wound at room temperature to obtain a continuous fiber of about 100 μm in diameter. By drying the fiber in vacuum, the solvents are completely removed from the fiber. From the data of DTA and TGA, the thermal decomposition of the polymer begins around 220° C.

Then, the fiber is cut into a length of about 10 cm, inserted in an insulative tube of aluminum oxide of an inner diameter of 0.8 mm and a length of 10 cm, and pyrolyzed to 600° C., 800° C., 1,000° C., or 1,200° C. in nitrogen atmosphere at a temperature raising rate of 10° C./min.

On the alumina fibers thus obtained, temperature dependency of electrical conductivity $\sigma$ (S·cm$^{-1}$) is measured by four terminals method as a function of temperatures ranging from room temperature to 380° C. by applying an alternating current of 100 KHz. The results are shown in the following Table 1 and the attached FIG. 1.

TABLE 1

| | Electrical conductivity of aluminous fiber | | | | |
| --- | --- | --- | --- | --- | --- |
| | Measuring temperature (°C.) | | | | |
| Firing temperature (°C.) | Electrical conductivity $\sigma$ (S·cm$^{-1}$) | | | | |
| | 30 | 100 | 200 | 300 | 380 |
| 600 | 0.07 | 0.07 | 0.07 | ☆ | ☆ |
| 800 | 2.88 | 4.58 | 7.48 | 11.6 | 15.0 |
| 1,000 | 3.75 | 4.41 | 6.17 | 13.4 | 30.0 |
| 1,200 | 14.1 | 14.8 | 10.6 | 11.4 | 78.3 |

☆ not measured

As seen clearly from the above Table 1, the electrical conductivity of the fibers corresponds to that of a semiconductor at any pyrolysis temperatures. The electrical conductivity of the alumina fibers obtained by the pyrolysis up to the temperatures not exceeding 800° C. increases monotonously with the increase of the measuring temperature. However, the alumina fibers obtained by pyrolysis up to 1,000° C. or 1,200° C. show rapid increases of the electrical conductivity at measuring temperatures of 300° C. or higher. When compared the case (symbol ◇ in FIG. 1) of the alumina fiber obtained from a precursor poly[(acyloxy)aloxane] comprising EPA and aliphatic carboxylic acid as ligands with the case (symbol ◯ in FIG. 1) of the alumina fiber obtained from a precursor poly[(acyloxy)aloxane] comprising EPA and aromatic carboxylic acid as ligands, the fiber of the latter case obtained from poly[(acyloxy)aloxane] having the incorporated aromatic ring at the side chain shows always an effective improvement of the electrical conductivity even when prepared by pyrolysis at the same conditions. From these facts, it is understood that a phase of carbon resulting from the organic side chains is existent in the matrix of aluminum oxide.

EXAMPLE 2

7.96 ml (58 mmol) of triethylaluminum is dissolved in 24 ml of tetrahydrofuran to obtain a 25 mol % solution. To the solution agitated at −20° C. is added dropwise a solution of 8.825 g of p-anisic acid and 8.222 g of 3-ethoxy propionic acid in 40 ml of tetrahydrofuran in nitrogen atmosphere. After completion of the addition, the solution is agitated for about 1 hr at room temperature. The system is cooled to −20° C. again, and a solution of 1.044 g of water in 10.6 ml of tetrahydrofuran is added dropwise under a stirring. After completion of the addition, the mixed solution is kept stirred for a few hours at room temperature under agitation. Thereafter, the product formed is precipitated in a large excess of hexane, filtered, and dried in vacuo to give a high polymer.

The high polymer thus obtained is dissolved in toluene containing 10 wt % of methanol to form a thick solution of 30 wt % of the solute. The thick solution is used as a spinning solution and a continuous fiber of a diameter of about 100 μm is prepared by a dry spinning method, in which a good spinnability is shown. The fiber is pyrolyzed to 600° C., 800° C., 1,000° C. or 1,200° C. in nitrogen atmosphere under the same conditions with those of Example 1, to give alumina fibers.

The electrical conductivity of the alumina fibers thus obtained are substantially same with the values of Example 1.

EXAMPLE 3

7.96 ml (58 mmol) of triethylaluminum is dissolved in 24 ml of tetrahydrofuran to obtain a 25 vol % solution. With stirring the solution at −20° C. is added dropwise a solution of a mixture of 8.825 g of p-anisic acid and 6.852 g of 3-ethoxy propionic acid in 35 ml of tetrahydrofuran in nitrogen atmosphere. After completion of the addition, the solution is agitated for about 1 hr at room temperature. The system is cooled to −20° C. again, and a solution of 1.044 g of water in 10.6 ml of tetrahydrofuran is added dropwise under agitation. After completion of the addition, the solution is kept stirring at room temperature for a few hours. Then, the system is heated to 70° C., and a solution of 1.370 g of 3-ethoxy propionic acid in 10 ml of tetrahydrofuran is added dropwise in it under agitation. After completion of the addition, the mixture is agitated for a few hours at room temperature. Thereafter, the product formed is precipitated in a large excess of hexane, filtered, dried in vacuo, to give a high polymer.

The high polymer thus obtained is dissolved in xylene containing 10 wt % of methanol at room temperature to obtain a thick solution of 30 wt %. The thick solution is used as a spinning solution to easily obtain a continuous fiber of a diameter of about 100 $\mu$m by a dry spinning method, in which a good spinnability is shown. The fiber is pyrolyzed to 600° C., 800° C., 1,000° C. or 1,200° C. in nitrogen atmosphere under the same conditions with those of Examples 1 and 2, to give alumina fibers.

The electrical conductivity of the alumina fibers thus obtained is substantially the same values as those of Example 1.

COMPARATIVE EXAMPLE 1

7.96 ml (58 mmol) of triethylaluminum in 24 ml of tetrahydrofuran to obtain a 25 vol % solution. With stirring the solution at $-20°$ C. is added dropwise a solution of 17.75 g of p-anisic acid in 40 ml of tetrahydrofuran in nitrogen atmosphere to form white precipitates. After completion of the addition, the solution is agitated for about an hour at room temperature. The system is cooled to $-20°$ C. again, and a solution of 1.044 g of water in 10.6 ml of tetrahydrofuran is added dropwise under agitation. The system turns gelatinous and after completion of the addition, the mixture is left at room temperature for a few hours. Subsequently, the product is precipitated in a large excess of hexane, filtered, dried in vacuo, to give a high polymer.

The high polymer thus obtained is insoluble in organic solvents, and incapable of preparing a thick solution thereof having a good spinnability.

COMPARATIVE EXAMPLE 2

7.96 ml (58 mmol) of triethylaluminum is dissolved in 24 ml of tetrahydrofuran to obtain a 25 vol % solution. With stirring the solution at $-20°$ C. is added dropwise a solution of a mixture of 4.292 g of propionic acid not having an aromatic ring and 8.222 g of 3-ethoxy propionic acid in 14 ml of tetrahydrofuran in nitrogen atmosphere. The system is cooled to $-20°$ C. again, and a solution of 1.044 g of water in 10.6 ml of tetrahydrofuran is added under agitation. After completion of the addition, the mixture is kept stirring at room temperature for a few hours. Thereafter, the product formed is precipitated in a large excess of hexane, filtered, and dried in vacuo, to give a high polymer.

The high polymer thus obtained is dissolved in toluene containing 10 wt % of methanol to obtain a thick 30 wt % solution. The thick solution is used as a spinning solution, and a continuous fiber of a diameter of about 100 $\mu$m is spun by dry spinning, in which a good spinnability is shown. The fiber is pyrolyzed to 800° C. in a nitrogen stream at a temperature raising rate of 10° C./min.

The electrical conductivity of the alumina fiber thus obtained is 1/100 of that of the alumina fiber obtained by pyrolysis up to 800° C. in Example 1.

As apparent from the foregoing descriptions, the electrically conductive alumina fiber can be used as an electric or electronic material for connection of electric or electronic circuits at critical limited states, particularly at elevated high temperature state, which are hitherto impossible to use such material for the electrical connection. In addition, the alumina fiber does not show an increase of the electric resistance at high temperatures which is an electric property of metals, so that it is an excellent electric or electronic material.

Moreover, the alumina fiber is derived from a precursor which is soluble in organic solvents, so that it can be produced to various shapes not limited to fibers.

Although the present invention has been explained with specific embodiments and numeral values, it is of course apparent to those skilled in the art that various changes and modifications are possible without departing from the broad spirit and aspect of the present invention as defined in the appended claims.

What is claimed is:

1. An electrically conductive alumina fiber which comprises an aluminum oxide matrix, and a continuous phase of carbon in the aluminum oxide matrix, the continuous phase of carbon providing an electrically conductivity of 2.88–78.3 S·cm$^{-1}$ to the alumina fiber, the alumina fiber being obtained by pyrolysis of a precursor fiber of poly[(acryloxy)aloxane] having the formula

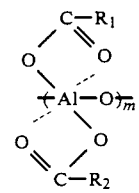

wherein, R$_1$ represents CH$_2$CH$_2$OCH$_2$CH$_3$, R$_2$ represents

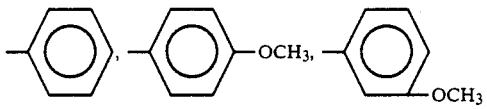

or another substituted aromatic group at 800°–1200° C. in an inert atmosphere.

2. An electrically conductive alumina fiber as defined in claim 1, further comprising an electrically insulative layer at the surface consisting solely of aluminum oxide, wherein carbon is substantially eliminated by the pyrolysis to yield the electrically insulative layer.

* * * * *